United States Patent [19]

Tibi et al.

[11] Patent Number: 5,864,556
[45] Date of Patent: Jan. 26, 1999

[54] MULTIPLEXER FOR AN ATM NETWORK WHICH EMPLOYS A HIERARCHICAL CELL ALLOCATION SCHEME

[75] Inventors: Georges Tibi, Fontenay aux Roses; Jean-Pierre Gauthier, Jouy en Josas, both of France

[73] Assignee: U.S. Philips Corporation, New York, N.Y.

[21] Appl. No.: 736,769

[22] Filed: Oct. 25, 1996

[30] Foreign Application Priority Data

Oct. 25, 1995 [FR] France ................................. 95 12582

[51] Int. Cl.$^6$ .................................................. H04L 12/54
[52] U.S. Cl. ............................................ 370/396; 370/415
[58] Field of Search ..................................... 370/229, 230, 370/235, 236, 395, 396, 397, 398, 399, 400, 401, 412, 413, 415, 417, 420; 395/200.43, 200.44, 200.48, 200.57, 200.62, 200.63, 200.64, 200.73, 200.74

[56] References Cited

U.S. PATENT DOCUMENTS

| | | | |
|---|---|---|---|
| 5,499,238 | 3/1996 | Shon ........................................ | 370/399 |
| 5,539,738 | 7/1996 | Tibi et al. ................................ | 370/412 |
| 5,629,928 | 5/1997 | Calvignac et al. ........................ | 370/237 |
| 5,633,864 | 5/1997 | Tibi .......................................... | 370/392 |
| 5,649,110 | 7/1997 | Ben-Nun et al. ......................... | 370/351 |
| 5,654,965 | 8/1997 | Takahashi et al. ........................ | 370/390 |
| 5,684,798 | 11/1997 | Gauthier .................................. | 370/395 |
| 5,687,324 | 11/1997 | Green et al. ............................. | 395/250 |
| 5,689,499 | 11/1997 | Hullett et al. ............................ | 370/235 |
| 5,694,554 | 12/1997 | Kawabata et al. ........................ | 370/392 |

FOREIGN PATENT DOCUMENTS

| | | | |
|---|---|---|---|
| 0596624A2 | 5/1994 | European Pat. Off. ........ | H04L 12/56 |
| 0632669A1 | 1/1995 | European Pat. Off. . | |
| 0689371A1 | 12/1995 | European Pat. Off. . | |
| 0735793A1 | 10/1996 | European Pat. Off. . | |

OTHER PUBLICATIONS

Asynchronous Transfer Mode, Solution for Broadband ISDN, Martin De Prycker, 1991 The Ellis Horwood Editions, Great Britain.

*Primary Examiner*—Chi H. Pham
*Assistant Examiner*—Kwang B. Yao
*Attorney, Agent, or Firm*—Robert J. Kraus

[57] ABSTRACT

A multiplexer for use in conjunction with a cell-based network, which includes a plurality of access terminals each of which receives respective cells, each of the cells having one of a plurality of different classifications, a plurality of FIFO buffers each of which is coupled to a respective one of the access terminals for queuing the cells received at the respective access terminals, a plurality of decoding elements each of which is coupled to a respective one of the FIFO buffers, and, an allocation circuit which generates a coded selection signal that is applied to each of the decoding elements, wherein the decoding elements each decode the coded selection signal for selectively reading the cells out of the FIFO buffers in a manner whereby the cells are read out of the FIFO buffers in an order which is dependent upon their classification. In the disclosed embodiment, the allocation circuit includes a memory which stores indexed connection time and date data at addressable storage locations in the memory, wherein the connection time and date data is stored in a hierarchical fashion according to respective connection priority levels, and is organized in different blocks each comprised of groups of connections having the same priority level, an addressing circuit which cycles through the memory addresses in such a manner that the connection time and date data of the highest priority level group is read out first and the connection time and date data of the lowest priority level group is read out last, a current date generating circuit which generates a current date at an allocation circuit cycle rate, a comparison circuit which compares the data and time of a currently addressed connection with the current date and which issues a validation signal upon detecting a match, and, a selector circuit which generates the coded selection signal in response to the validation signal.

12 Claims, 3 Drawing Sheets

MULTIPLEXER FOR AN ATM NETWORK WHICH EMPLOYS A HIERARCHICAL CELL ALLOCATION SCHEME

BACKGROUND OF THE INVENTION

The present invention relates to a multiplexer for an ATM network, e.g., such as the one described in European Patent Specification No. 0 618 749.

The ATM technique (Asynchronous Transfer Mode) makes it possible to transmit data of different types (sound, image, files etc.) on the same carrier. These data are arranged in packets called cells which have a standardized length of 53 bytes. An address contained in the header and formed by two fields, the VPI (Virtual Path Identifier) and the VCI (Virtual Channel Identifier) ensures the routing of the cells within the ATM network and thus permits of setting up a connection between a calling subscriber and a called subscriber. The payload of the transmission frame is called the ATM path. A succession of ATM cells which have the same VPI constitutes a virtual path VP. The route followed by a succession of ATM cells for the same VPI and the same VCI forms a virtual channel VC.

However, although the basic format of the cell is the same for all the data of different kinds, each of the connections one has to provide for each kind has its own characteristics in terms of traffic and Quality of Service (QoS). The characteristics, (including price . . . ) of each connection are to be specified in a detailed manner in the contract which binds the user of the ATM connection and the operator of the network. This contact binds both the user and the network provider:

The network provider agrees to transmit the user's data (ATM cells) with a certain service quality (specified in terms of average or maximum cell transmission time, number of error cells, number of lost cells etc. . . . ), for a traffic pattern specified in the contract and at a price fixed in the contract.

The user undertakes to pay for the data transmission service provided for him by the network, and is advised that if he does not comply with the traffic pattern specified in the contract, the network will no longer guarantee the service quality (for example, the network may destroy cells which are "outside" the traffic pattern fixed by the contract), For accessing the ATM network, one is thus confronted with rate constraints and with problems of jitter both as regards the virtual path VP and as regards the virtual channel VC. The jitter which manifests itself by an irregularity in the time of appearance of the cells is particularly annoying for applications called real-time applications, for example, for video services.

SUMMARY OF THE INVENTION

The access point to the network is ensured by a multiplexing device which is consequently to comprise means for connecting the cells in the ATM path so that they are in conformity with this policy and so that the least possible jitter is produced.

Therefore, a system of the type mentioned in the opening paragraph is characterized in that the allocation circuit comprises, for example:

means for producing an authorization preparation signal for transmitting the cell to the transmission controller for each service circuit in shorter time periods than the inverse of the rate of the allocation circuit.

Thus, according to the measures recommended by the invention, the authorizations are already prepared with a timing close to the desired timing and the fact that this timing is faster than the desired rate permits of an easier management of these authorizations by simply rejecting the redundant authorizations.

According to a highly significant characteristic feature of the invention, with a view to permitting this easier management, such a communications system is characterized in that the other means of the allocation circuit are formed by a distribution device for establishing groups of at least one connection and blocks of groups of which the number is a decreasing function of the rate of the connections, a data and period assigning circuit for assigning to each connection a transmission date and a period determined by the rate of the allocation circuit a clock circuit for producing a current date, a selection circuit for cyclically selecting one group in each block, a comparing circuit for producing an indication of a past or a future date in timing with said preparation signal by comparing the transmission date of each connection of the selected groups with the current date, a re-assigning circuit for re-assigning the same transmission date for an indication of a future date or for adding to the transmission date said time period for an indication of the past date, a validation circuit for producing an authorization signal for the transmission of a cell at the transmission instruction of the service circuits on the basis of the indication of a past date.

These and other aspects of the invention will be apparent from and elucidated with reference to the embodiments described hereinafter.

DETAILED DESCRIPTION OF THE PREFERRED EMBODIMENT

Figure 1:
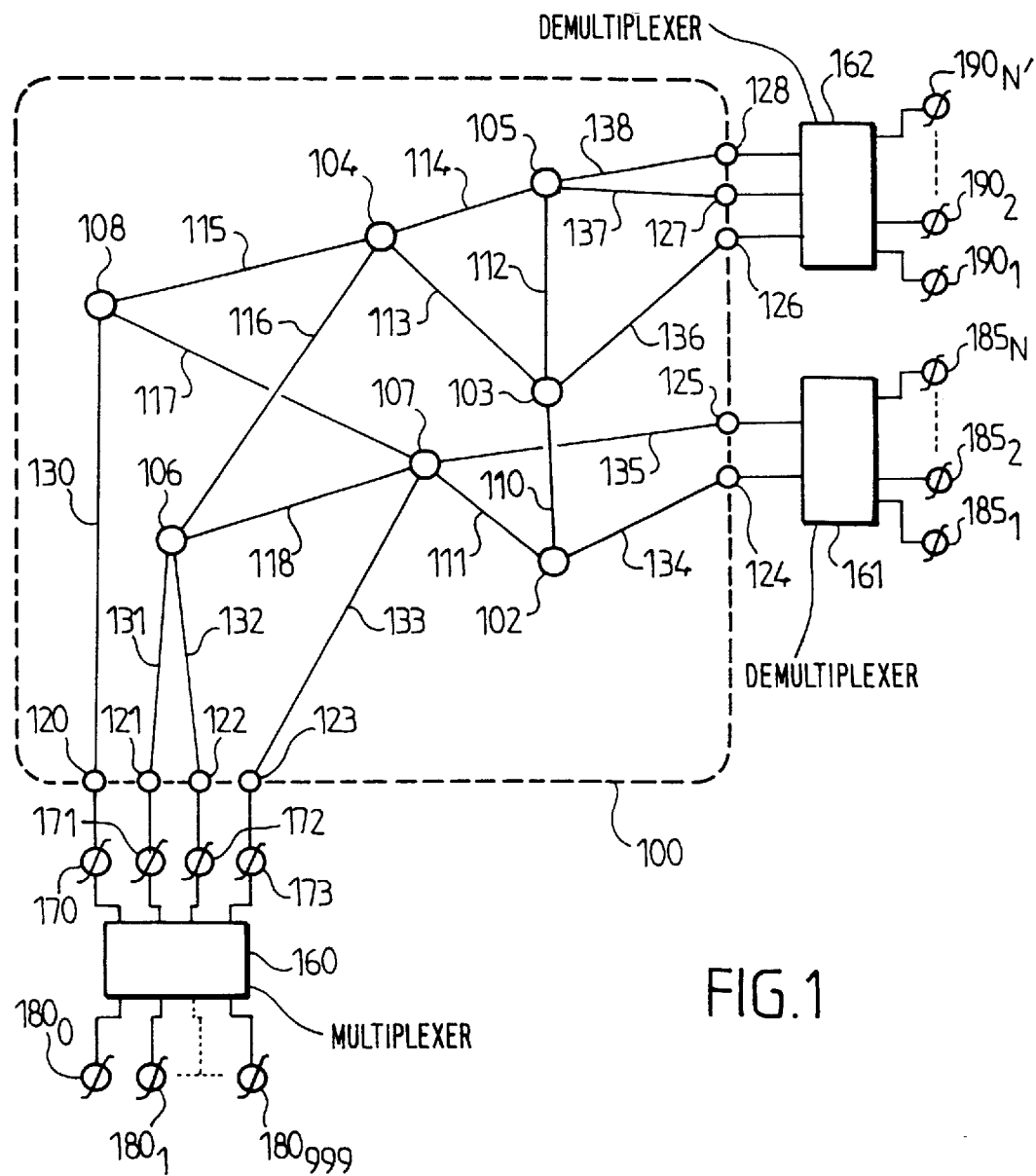
FIG. 1 shows a network in which a multiplexing device according to the invention is connected.
Figure 2:
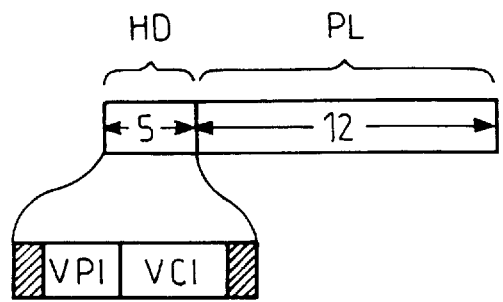
FIG. 2 shows the structure of the information cells transmitted through the network.

FIG. 1 shows in a diagrammatic manner an ATM network which is referenced 100 in the Figure. A description of this network will be found in te publication: "ASYNCHRONOUS TRANSFER MODE" by Martin de PRYCKER, published in 1991 in the ELLIS HORWOOD Editions, Great Britain. This network is formed by various nodes 102, 103, 104, 105, 106, 107 and 108 interconnected by links 110 to 118 for connecting respectively, the nodes 102–103, 102–107, 103–105, 103–104, 104–105, 104–108, 104–106, 107–108, and 106–107. Various access points to this network are referenced 120 to 128. These access points are connected respectively, to the nodes 108, 106, 106, 107, 102, 107, 103, 105 and 105 via the respective links 130 to 138. Various multiplexing and demultiplexing devices 160, 161 and 162 are connected to these access points. Among these devices there should be distinguished: a multiplexing device 160 which forms part of the present invention, and two demultiplexing devices 161 and 162 which perform reverse operations to those of device 160 and which form part of the system of the invention. In European Patent Specification EP 0 632 669, filed 23 Jun. 1994, a description will be found of such demultiplexing devices. To be connected to the four points 120, 121, 122, 123, the multiplexing device 160 has four conning terminals 170, 171, 172 and 173, Thus, within the framework of this described example, the information can go from device 160 to the devices 161 and 162 by passing through the network 100. This transmit information is applied to a plurality of access terminals $180_0$ to $180_{999}$ which the multiplexing device 160 has and can, for example, be produced on output terminals $185_1$ to $185_N$ of the device 161 and $109_1$ and $190_{N'}$ of the device 162. The order of magnitude of N and N' is one thousand. The information transmitted through the network is produced in the form of cells whose structure is shown in FIG. 2. These cells are formed by 53 octets: 5 of which forming the header field HD and the 48 remaining octets referenced P1 containing the data for a transmission service. In the header field, two codes VPI and VCI are distinguished which correspond to virtual path identifier and virtual circuit identifier, respectively. The virtual path Identifiers are processed by the transmission operator and the virtual circuit identifier by the network provider.

Figure 3:
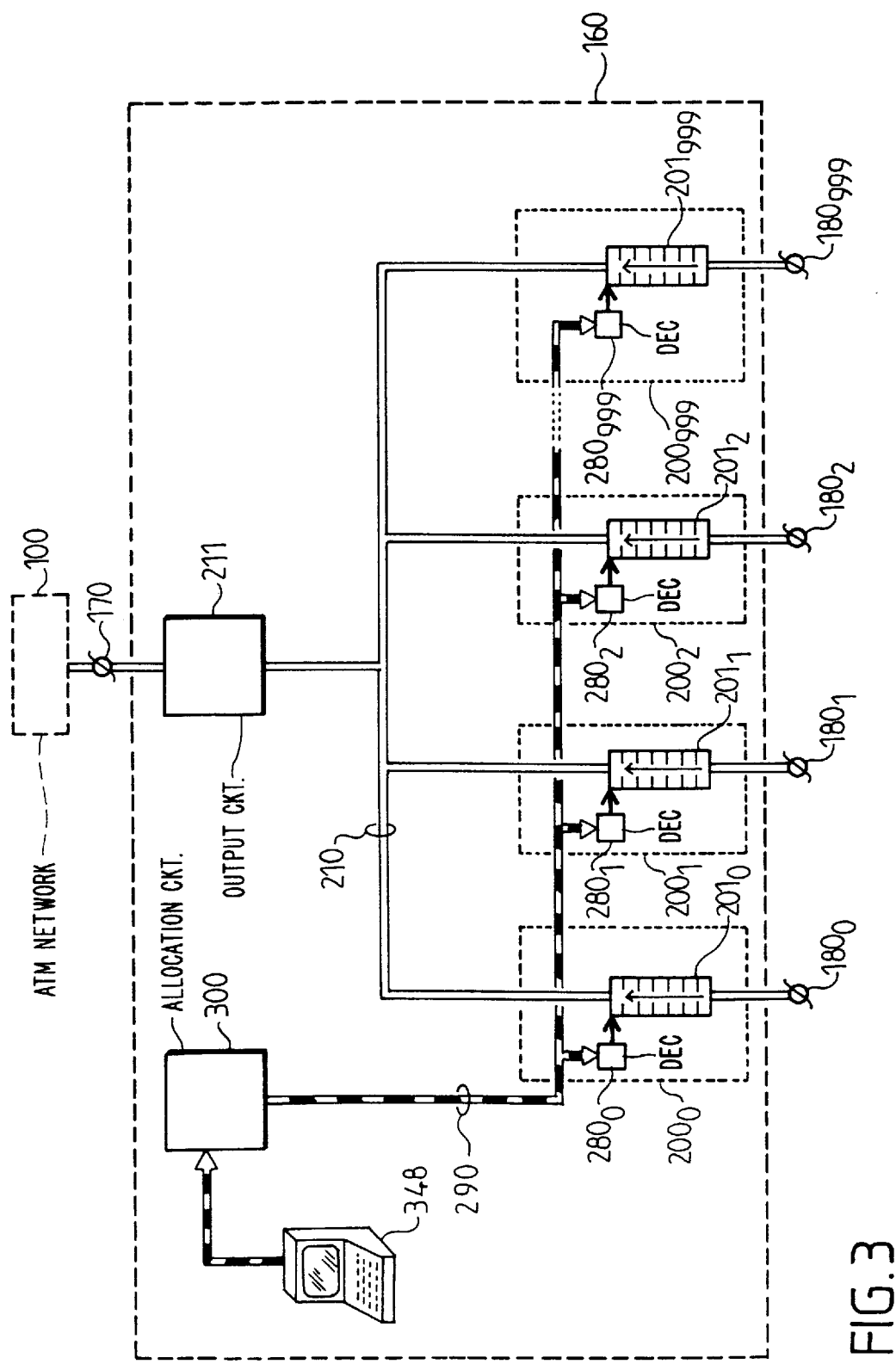
FIG. 3 shows a multiplexing device according to the invention.

FIG. 3 shows a diagram of the multiplexing device 160. To simplify the exposé, attention is only paid in this drawing Figure to the cells to be supplied to the single terminal 170 from access terminals $180_0$ to $180_{999}$.

Each of these terminals $180_1$ to $180_{999}$ receives cells that have the same identifier and the same traffic constraints. The cells are stored in buffer elements which form part of queue elements $200_0$ to $200_{999}$, respectively. These various elements $200_0$ to $200_{999}$ are formed by memories of the FIFO type $201_0$ to $201_{999}$, respectively. These memories return on their output the data in the order in which the data have come in. A common data line 210 connects the output of the queue elements to the terminal 170, via an output circuit 211 which is a simple circuit for adapting signals on the terminal 120. The queue elements $200_0$ to $200_{999}$ also comprise elements for authorizing the sending which have occurred in the form of a decoding elements $280_0$ to $280_{999}$. The inputs of these decoding elements are connected to a third common line 290 which interconnects all the queue elements $200_0$ to $200_{999}$. As a recognition code "i" ($0 \leq i \leq 999$) is assigned to each of these elements $200_0$ to $200_{999}$, these decoders will decode the code that is transmitted.

An allocation circuit 300 processes the recognition code over this last line 290 to authorize the queue element indicated by this code, to transmit a cell called chosen cell. The allocation circuit is managed by a management element shown in the form of an data processing terminal 348.

Figure 4:
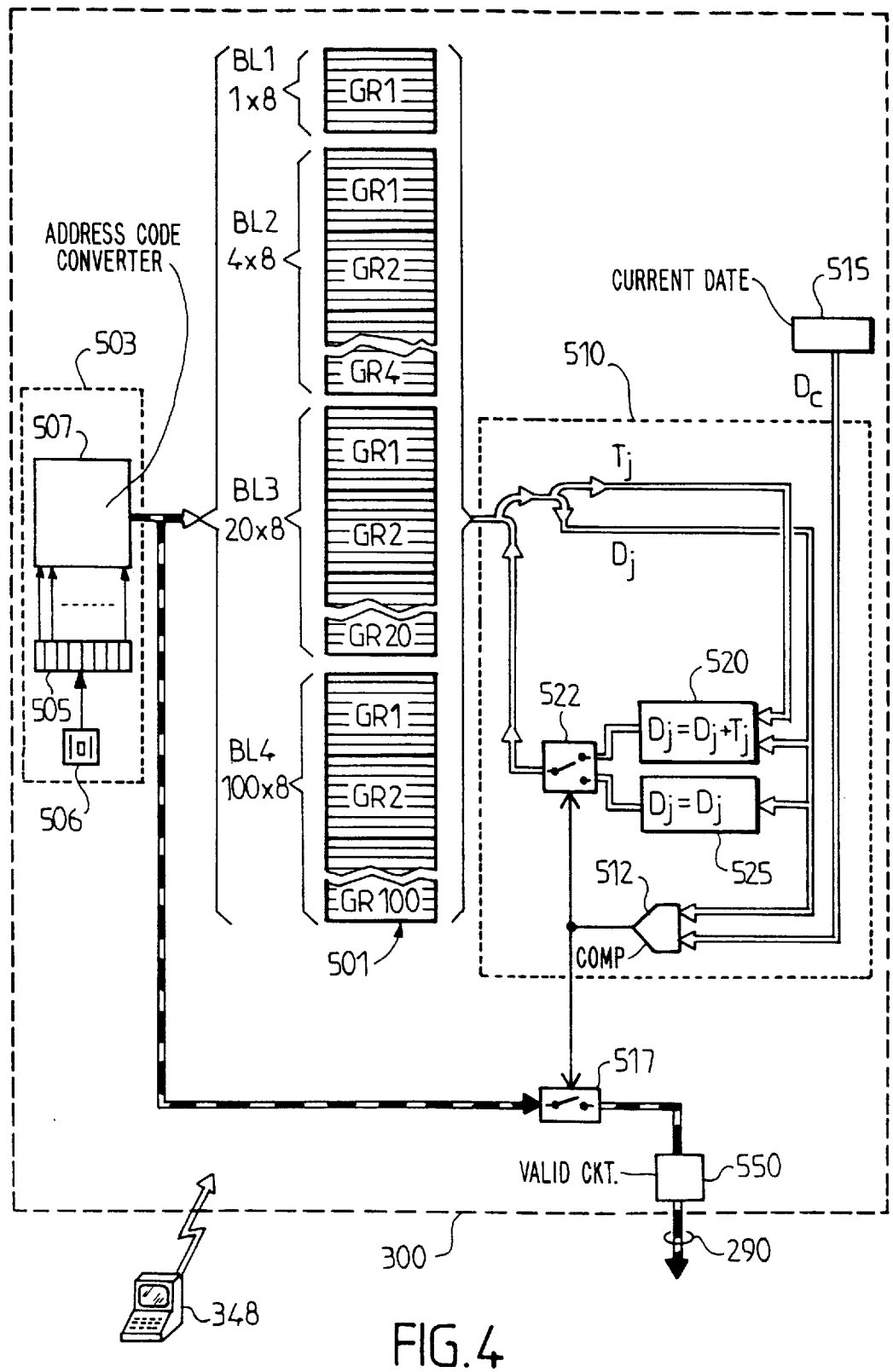
FIG. 4 shows the structure of an allocation circuit which forms part of the device shown in FIG. 3.

FIG. 4 shows the structure of the circuit 300. This circuit is made around a memory 501 formed by as many lines as there are connections to be managed. Each line comprises two words: a date $D_j$ and a period $T_j$. The index "j" of the references of these words can be made the same as the recognition codes "i" mentioned above.

According to the invention, the connections are classified in decreasing rates from high to low in the Figure. They are arranged in four blocks BL1 to BL4. Each of these blocks is divided into groups of eight connections. The block BL1 comprises 1 group, the blocks BL2, BL3 and BL4 comprise 4, 20 and 100 groups, respectively. This subdivision is initially made via terminal unit 348. To this memory 501 is associated an addressing set 503 formed by a counter 505 which counts the pulses of a clock circuit 506 and by an address code converter 507. This clock produces four phases (reading, comparing, writing, resting) necessary for the processing circuit 510. As 32 connections are scanned in each transmission period "u" of an ATM cell, the period of the clock signal is thus equal to u/(4*32). According to a preferred embodiment of the invention, the converter is arranged in the following manner, indicated by a truth table explained in the Table I below. Depending on its complexity, this Table can be drawn up in various manners:

ROM (read-only memory)
RAM (random access memory)
combinatorial logic
state automaton, in which case the counter 505 may be integrated.

TABLE I

| counter | address line | counter | address line |
|---|---|---|---|
| 0001 | BL1, | ... | ... |
| 0008 | CX1 ... CX8 | | |
| 0009 | BL2, GR1 | 0617 | BL2,GR4 |
| 0016 | CX1 ... CX8 | 0624 | CX1 ... CX8 |
| 0017 | BL3, GR1 | 0625 | BL3,GR20 |
| 0024 | CX1 ... CX8 | 0632 | CX1 ... CX8 |
| 0025 | BL4,GR1 | 0633 | BL4,GR20 |
| 0032 | CX1 ... CX8 | 0640 | CX1 ... CX8 |
| 0033 | BL1, | 0641 | BL1 |
| 0040 | CX1 ... CX8 | 0648 | CX1 ... CX8 |
| 0041 | BL2,GR2 | 0649 | BL2,GR1 |
| 0048 | CX1 ... CX8 | 0656 | CX1 ... CX8 |
| 0049 | BL3,GR2 | 0657 | BL3,GR1 |
| 0056 | CX1 ... CX8 | 0664 | CX1 ... CX8 |
| 0057 | BL4,GR2 | 0665 | BL4,GR21 |
| 0064 | CX1 ... CX8 | 0672 | CX1 ... CX8 |
| 0065 | BL1, | 0673 | BL1 |
| 0072 | CX1 ... CX8 | 0680 | CX1 ... CX8 |
| 0073 | BL2,GR3 | 0681 | BL2,GR2 |
| 0080 | CX1 ... CX8 | 0688 | CX1 ... CX8 |
| 0081 | BL3,GR3 | 0689 | BL3,GR2 |
| 0088 | CX1 ... CX8 | 0696 | CX1 ... CX8 |
| 0089 | BL4,GR3 | 0697 | BL4,GR22 |
| 0096 | CX1 ... CX8 | 0704 | CX2 ... CX8 |
| 0097 | BL1, | ... | ... |
| 0104 | CX1 ... CX8 | | |
| 0105 | BL2,GR4 | 3161 | BL4,GR99 |
| 0112 | CX1 ... CX8 | 3168 | CX1 ... CX8 |
| 0113 | BL3,GR4 | 3169 | BL1 |
| 0120 | CX1 ... CX8 | 3176 | CX1 ... CX8 |
| 0121 | BL4,GR4 | 3177 | BL2,GR4 |
| 0128 | CX1 ... CX8 | 3184 | CX1 ... CX8 |
| 0129 | BL1, | 3185 | BL3,GR20 |
| 0136 | CX1 ... CX8 | 3192 | CX1 ... CX8 |
| 0137 | BL2,GR1 | 3193 | BL4,GR100 |
| 0144 | CX1 ... CX8 | 3200 | CX1 ... CX8 |

This Table gives in the left column the contents of the counter 505 and in the right column the addressed elements. This addressing is split up into cycles assigned each to a cell period "u". During each cycle, eight connecting lines of all the blocks are processed. With each cycle, all the connecting lines of block BL1 are processed, Four cycles are needed to process the connecting lines of the block BL2, 20 cycles for those of block BL3 and 100 cycles for cells of block BL4.

The processing circuit 510 ensures that the various dates $D_j$ of the connecting lines are updated. Therefore, a comparator 512 is provided, which compares the dates $D_j$ stored at the location defined by the addressing set 503 with a current date $D_0$ produced by a current date circuit 515.

If the date $D_j$ is a past date or a current date, the comparator produces a signal which validates the connecting line to send a cell. This is shown in the diagram by a switch 517. An adder 520 adds $T_j$ to the date $D_j$. The result is then recorded on this same connecting line via a switch 522.

If the date $D_j$ is a future date, a cell is not sent, the switch 515 is open and the date $D_j$ which is written in register 525 is put back at its location.

A validation circuit 550 makes it possible to authorize the transmission. This circuit 550 may be either a simple queue which receives on the input the formed identifiers, the address codes validated by the closed position of the switch 517, and which transmits with each cell period the identifier located at the head of the queue, or a circuit of the type described in European Patent No. 0689371. This document describes a tree circuit which implies stop dates.

It will be recollected that "u" is the "cell period" of the common physical connection which supports the ATM connections (in the case under consideration they are all multiplexed on the same physical link). When taking the case of a standard SDH (synchronous digital hierarchy) access link of 155.52 mbit/s, this yields a still period of the order of 3 microseconds. As 1000 ATM connections are to be processed simultaneously, the date comparing device performs only 32 operations per time unit u. Moreover, it is supposed that the sum of the rates of the connections is at most equal to the useful rate of the physical link (load equal to 100% at most, the "statistical multiplexing" properties better known in the English literature by the name of overbooking of the ATM are not used). For comprehending the following of the document, first the following "lemma" will be established:

A connection situated in box "n" of the Table has a period at least equal to $n*u$.

The sum of the rates of all the connections is lower than 100% of the multiplex rate; in consequence, this is valid for the sum of the rates "$Deb_i$" of the connections 1 to n (sum limited to the connections that have the highest rate at the top of the Table).

The more the rates $Deb_i$ are classified in a decreasing order, the more this sum of the rates from 1 to n exceeds $n*Deb_n$ because $Deb_n$ is lower than or equal to $Deb_i$ for i lower than a, according to the classification).

One thus has, by diminishing the value of the n−1 first terms of the sum by $Deb_n$, $n*Deb_n$ lower than 100% of the multiplex, which means that $Deb_n$ is at most equal to $1/n^{th}$ multiplex rate.

The latter property translated into terms of a period ($Tn=1/Deb_n$ and $u=1/Deb_{multiplex}$) produces the relation to be proved:

Tn higher than or equal to $n*u$.

This result being demonstrated, the operation of the device may be presented as follows: Each Tj and the current date are initialized at the value t0. During each time unit u the processing capacity of 32 connections by the comparing device will be used as follows:

Processing of the 8 connections of group 1 (at the top of the Table)

Processing of 8 connections of group 2 (cyclically, thus in 4 time units each of the 32 connections will be processed), Processing of 8 connections of group 3 (cyclically, thus in 20 time units each of the 160 connections will be processed), Processing of 8 connections of group 4 (cyclically, thus in 100 time units each of the 800 connections will be processed).

This connection processing has already been explained above.

This device is to ensure that each of the connections j is processed with an "irregularity" of at least Tj/2 owing to the classification of the connections in decreasing rates, as this has been explained above.

The classification of the connections having been given in decreasing rates, higher-rate connections are obtained in groups 1 to 8; one may say for each of them that its associated period Tj is more than or equal to u; each of these connections is processed in each period u (because there are 8 connections in the group and 8 processings per period u for this group), there is thus immediately detected that a send authorization date $D_j$ arrives on schedule for one of these connections.

For group 2, the connections owing to the classification made will have a period higher than or equal to $9*u$ (because the respective connections are all located after the 9th box in the Table, cf. lemma demonstrated above). For this group, the 32 connections are processed in 4 periods u because one has 8 processing resources per period u for this group. Thus, being given that all the periods of the connections of group 2 are higher than $4.5*u$, there is thus derived that the processing irregularities for the connections of this group are all less than tj/2.

The same holds for the group 3, for which the periods of the connections are more than or equal to $41*u$; the complete processing for his group is, in effect, performed in 20 periods u (i.e. 160 connections and 8 processings per period), which ensures an irregularity which is less than Tj/2.

Finally, for group 4, with periods of more than or equal to $201*u$, with 800 connections in all and 8 processings per period, the whole group is processed in 100 periods u, which ensures the sought result.

Thus, with the measures according to the invention, it is possible to process 1000 connections with a single comparator which has a processing capacity of 32 connections per period u (multiplex cell period).

The invention may thus be resumed to the following points:

a) Use the tolerance margin of the network with respect to irregularities (<Tj/2), b) classify the connections in the Table of send authorization dates, c) correctly select the dividing algorithm of the "comparison resources".

The following generalizations form part of the reserved domain of the invention:

a) The invention may be used with classifications in the Table, and resource dividing algorithms which are different from those proposed here, which algorithms would be linked to the quality of service of the connections.

One may take a "simplistic" example: If there is a particular connection which calls for a processing in each period u to avoid an irregularity, this connection may be positioned in group 1 whatever its rate. In this example it may clearly be seen that this does not disturb the other connections which have been shifted down. This type of use could be repeated infinitely: for a given resource dividing algorithm, the positioning of a connection given in the Table guarantees a certain quality of service, these quality of service guarantees may thus be allocated to this or that connection depending on sufficiently varied criterions.

b) This principle of resource dividing could also be generalized to resources other than "comparison resources". A simple example which may be given here is the case of a microprocessor which is to read cell counters (by resetting them to zero) for various ATM connections at various rates, these counters having all the same size, for example, being 16-bits counters. The problem to be solved is how to avoid saturation of a counter. For this purpose, the worst case scenario may be taken into account and all the counters may be read sufficiently fast so that none of them has the time to saturate. This will be a heavy load on the microprocessor if there are of the order of several thousand connections.

Another solution consists of utilizing a similar function to the one proposed in the present application, The Table this time contains counters to be read, which are kept updated by a counting process (in each period u a single counter is incremented, because this corresponds to the transmission or reception of a single cell), and the divided resource is here the CPU time of the microprocessor. The microprocessor will read the counters of the high-rate connections (at the top of the Table) more often than those of the low-rate connections at the bottom, because the latter take more time to saturate. CPU time will thus be saved while each of the connections is processed correctly.

The general principle of the present invention will consequently be a "personalization" or a "non-popularization" of the processings of the ATM connections: instead of having an "upward leveling", that is to say, instead of processing all the connections as if they were all a maximum requirement in terms of processing, which is certainly very costly, the differences which exist between them to allocate the resources more intelligently are taken into account (by realizing savings on price, service or processing time or by processing a distinctly higher number of connections), This mechanism is certainly more complex to implement, but rapidly reaches its "profitability threshold".

There should be observed that according to the invention the system provides the following significant advantage aver the prior art: the addition of a connection does not require new calculations of the contents of a dividing Table as described in European Patent Specification No. 0 618 749.

This long and disadvantageous process in a network where dozens of connections are set up per second. The code converter 507 takes the place of the "generic distribution Table". The addition of a connection j is simply made by loading Tj and Dj.

However, at the cost of losing this advantage to gain another, the jitter may be reduced to a much lower value than period Tj for the respective connection j. The use of a RAM for the realization of the code converter makes it possible to personalize each connection, The addition of one connection is thus costly as regards configuration, but the jitter level may be lowered drastically.

Thus, for the moment a device is considered which scans a single connection per cycle u. The memory of the converter is loaded in the same fashion as has been described with reference to European Patent Specification No. 0 618 748 (that is to say, a connection has a code regularly spaced in the memory of "d" elements if it represents 1/d of the total rate of the ATM channel). The processing circuit 510 is then transparent and sees dates Dj which are always past dates. The maximum jitter is then one period Tj (while neglecting the interconnection interactions), If, without modifying the memory of the code converter, the scanning of 32 connections per cycle u is authorized and if one provides the device of the notification circuit described in European Patent Specification No. 0689371 and European Patent Specification No. 0735793, the generated jitter is not more than Tj/32.

Certainly, in order to be efficient in the latter mode, the device is to be followed by a "stop date" selection circuit described, for example, in the Patent Specifications cited above.

We claim:

1. A multiplexer for use in conjunction with a cell-based network, including:
    a plurality of access terminals each of which receives respective cells, each of the cells having one of a plurality of different classifications;
    a plurality of FIFO buffers each of which is coupled to a respective one of the access terminals for queuing the cells received at the respective access terminals;
    a plurality of decoding elements each of which is coupled to a respective one of the FIFO buffers; and,
    an allocation circuit which generates a coded selection signal that is applied to each of the decoding elements, wherein the decoding elements each decode the coded selection signal for selectively reading the cells out of the FIFO buffers in a manner whereby the cells are read out of the FIFO buffers in an order which is dependent upon their classification;
    wherein the allocation circuit includes: a memory which stores indexed connection time and date data at addressable storage locations in the memory, wherein the connection time and date data is stored in a hierarchical fashion according to respective connection priority levels, and is organized in different blocks each comprised of groups of connections having the same priority level; an addressing circuit which cycles through the memory addresses in such a manner that the connection time and date data of the highest priority level group is read out first and the connection time and date data of the lowest priority level group is read out last; a current date generating circuit which generates a current date at an allocation circuit cycle rate; a comparison circuit which compares the data and time of a currently addressed connection with the current date and which issues a validation signal upon detecting a match; and a selector circuit which generates the coded selection signal in response to the validation signal.

2. The multiplexer as set forth in claim 1 wherein the highest priority level corresponds to a highest-rate connection, and the lowest priority level corresponds to a lowest-rate connection.

3. The multiplexer as set forth in claim 1, wherein a selected group of connections are processed by the allocation circuit during each allocation circuit cycle.

4. The multiplexer as set forth in claim 1, wherein the coded selection signal is generated at a rate which is 1/the allocation circuit cycle rate.

5. The multiplexer as set forth in claim 4, wherein the cell-based network is an ATM network.

6. The multiplexer as set forth in claim 1, wherein the cell-based network is an ATM network.

7. A multiplexer for use in conjunction with a cell-based network, including:
    a plurality of access terminals each of which receives respective cells, each of the cells having one of a plurality of different classifications;
    a plurality of FIFO buffers each of which is coupled to a respective one of the access terminals for queuing the cells received at the respective access terminals;
    a plurality of decoding elements each of which is coupled to a respective one of the FIFO buffers; and,
    allocation means which generates a coded selection signal that is applied to each of the decoding elements, wherein the decoding elements each decode the coded selection signal for selectively reading the cells out of the FIFO buffers in a manner whereby the cells are read out of the FIFO buffers in an order which is dependent upon their classification;

wherein the allocation means includes: memory means for storing indexed connection time and date data at addressable storage locations, wherein the connection time and date data is stored in a hierarchical fashion according to respective connection priority levels, and is organized in different blocks each comprised of groups of connections having the same priority level; addressing means which cycles through the memory addresses in such a manner that the connection time and date data of the highest priority level group is read out first and the connection time and date data of the lowest priority level group is read out last; a current date generating circuit which generates a current date at an allocation means cycle rate; comparison means for comparing the data and time of a currently addressed connection with the current date and which issues a validation signal upon detecting a match: and selector means which generates the coded selection signal in response to the validation signal.

8. The multiplexer as set forth in claim 7, wherein the highest priority level corresponds to a highest-rate connection, and the lowest priority level corresponds to a lowest-rate connection.

9. The multiplexer as set forth in claim 7, wherein a selected group of connections are processed by the allocation means during each allocation means cycle.

10. The multiplexer as set forth in claim 7, wherein the coded selection signal is generated at a rate which is 1/the allocation means cycle rate.

11. The multiplexer as set forth in claim 10, wherein the cell-based network is an ATM network.

12. The multiplexer as set forth in claim 7, wherein the cell-based network is an ATM network.

* * * * *